(12) United States Patent
Li

(10) Patent No.: US 10,700,509 B2
(45) Date of Patent: Jun. 30, 2020

(54) POWER SWITCHING DEVICE AND CONTROL METHOD THEREOF

(71) Applicant: Nuvoton Technology Corporation, Hsinchu Science Park (TW)

(72) Inventor: Cheng-Tao Li, Hsinchu (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 287 days.

(21) Appl. No.: 15/830,022

(22) Filed: Dec. 4, 2017

(65) Prior Publication Data

US 2018/0191149 A1 Jul. 5, 2018

(30) Foreign Application Priority Data

Dec. 30, 2016 (TW) .................................. 105144156

(51) Int. Cl.
*H02H 3/10* (2006.01)
(52) U.S. Cl.
CPC .................................. *H02H 3/105* (2013.01)
(58) Field of Classification Search
CPC .............................. H02H 3/105; H02H 11/006
USPC .............................. 361/93.1–93.9, 91.1–91.5
See application file for complete search history.

(56) References Cited

U.S. PATENT DOCUMENTS

| 7,817,393 | B2 | 10/2010 | Forghani-Zadeh et al. |
| 2011/0221413 | A1 | 9/2011 | Pigott |
| 2015/0146328 | A1* | 5/2015 | Mikami ............... H02H 7/1213 361/18 |

FOREIGN PATENT DOCUMENTS

| CN | 106099864 A | 11/2016 |
| TW | 200536226 A | 11/2005 |
| TW | 200903966 A | 1/2009 |

* cited by examiner

*Primary Examiner* — Dharti H Patel
(74) *Attorney, Agent, or Firm* — Muncy, Geissler, Olds & Lowe, P.C.

(57) ABSTRACT

A power switching device is provided. A first transmitting switch transmits an input voltage to an output node when the first transmitting switch is turned on. When the current passing through the first transmitting switch exceeds a predetermined value, a current limiting circuit turns off the first transmitting switch. When a short circuit occurs between the output node and a ground node, a short protection circuit turns off the first transmitting switch. The short protection circuit includes a first comparator and a first set circuit. The first comparator compares a voltage of the output node and a first reference voltage to generate a first comparison result to turn off the first transmitting switch. The first set circuit generates the first reference voltage according to the voltage of the output node. The first reference voltage is less than the voltage of the output node.

17 Claims, 6 Drawing Sheets

POWER SWITCHING DEVICE AND CONTROL METHOD THEREOF

CROSS REFERENCE TO RELATED APPLICATIONS

This Application claims priority of Taiwan Patent Application No. 105144156, filed on Dec. 30, 2016, the entirety of which is incorporated by reference herein.

BACKGROUND OF THE INVENTION

Field of the Invention

The present disclosure relates to a power switching device, and more particularly to a power switching device configured to transmit an input voltage to an output node.

Description of the Related Art

A conventional transmitting switch generally transmits an input voltage to an output node to provide power to elements coupled to the output node. However, when the output node is connected to a ground node, the voltage of the output node may be suddenly dropped to a ground level. Since a large current passes through the transmitting switch, the transmitting switch and elements coupled to the output node are damaged.

BRIEF SUMMARY OF THE INVENTION

In accordance with an embodiment, a power switching device comprises a first transmitting switch, a current limiting circuit and a short protection circuit. The first transmitting switch transmits an input voltage to an output node when the first transmitting switch is turned on. The current limiting circuit is coupled to the first transmitting switch to detect a current passing through the first transmitting switch. When the current exceeds a predetermined value, the current limiting circuit turns off the first transmitting switch. The short protection circuit is coupled to the first transmitting switch. When a short circuit occurs between the output node and a ground node, the short protection circuit turns off the first transmitting switch. The short protection circuit comprises a first comparator and a first set circuit. The first comparator compares a voltage of the output node and a first reference voltage to generate a first comparison result to turn off the first transmitting switch. The first set circuit receives the voltage of the output node and generates the first reference voltage according to the voltage of the output node. The first reference voltage is less than the voltage of the output node.

An exemplary embodiment of a control method for a power switching device is described in the following. The power switching device comprises a first transmitting switch. When the first transmitting switch is turned on, the first transmitting switch transmits an input voltage to an output node. The current passing through the first transmitting switch is detected. When the current is higher than a first predetermined value, the first transmitting switch is turned off. When the current is less than the first predetermined value, the first transmitting switch is turned on. The voltage of the output node is detected. When the voltage of the output node is less than a second predetermined value, the first transmitting switch is turned off.

BRIEF DESCRIPTION OF THE DRAWINGS

The present disclosure can be more fully understood by referring to the following detailed description and examples with references made to the accompanying drawings, wherein.

DETAILED DESCRIPTION OF THE INVENTION

Figure 1:
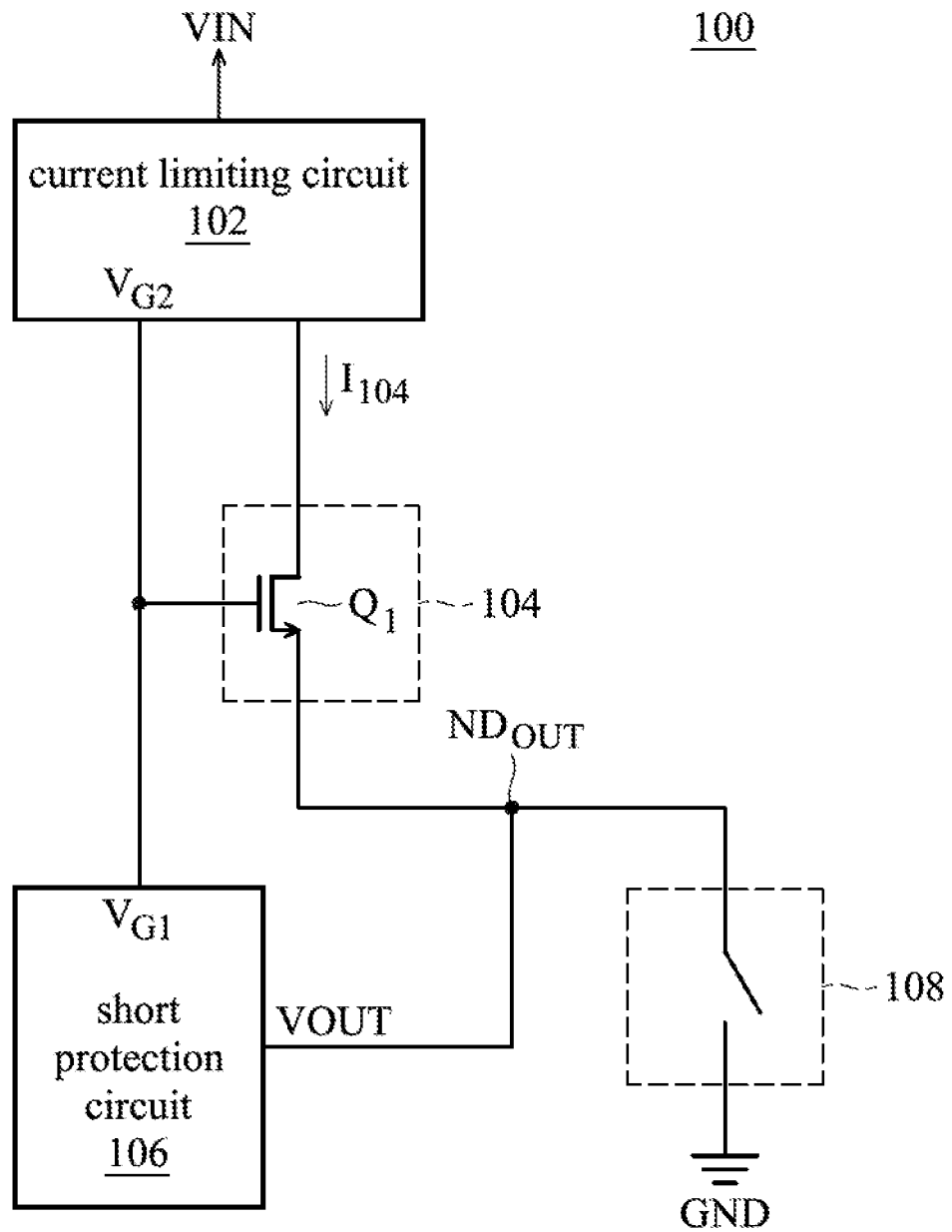
FIG. 1 is a schematic diagram of an exemplary embodiment of a power switching device, according to various aspects of the present disclosure.

The present disclosure will be described with respect to particular embodiments and with reference to certain drawings, but the present disclosure is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the present disclosure.

FIG. 1 is a schematic diagram of an exemplary embodiment of a power switching device, according to various aspects of the present disclosure. The power switching device 100 comprises a current limiting circuit 102, a transmitting switch 104 and a short protection circuit 106. The power switching device 100 is configured to transmit an input voltage VIN to an output node $ND_{OUT}$. In this embodiment, the transmitting switch 104 receives the input voltage VIN via the current limiting circuit 102. When the transmitting switch 104 is turned on, the transmitting switch 104 transmits the input voltage VIN to the output node $ND_{OUT}$.

The present disclosure does not limit the kinds of transmitting switch 104. In one embodiment, the transmitting switch 104 is an N-type transistor $Q_1$. The N-type transistor $Q_1$ is controlled by the gate signal $V_{G1}$ or $V_{G2}$. The gate of the N-type transistor $Q_1$ receives the gate signal $V_{G1}$ or $V_{G2}$. The drain of the N-type transistor $Q_1$ receives the input voltage VIN via the current limiting circuit 102. The source of the N-type transistor $Q_1$ is coupled to the output node $ND_{OUT}$. When the gate signal $V_{G1}$ or $V_{G2}$ is a high-level voltage, the N-type transistor $Q_1$ is turned on to transmit the input voltage VIN to the output node $ND_{OUT}$. When the gate signal $V_{G1}$ or $V_{G2}$ is a low-level voltage, the N-type transistor $Q_1$ is turned off to stop transmitting the input voltage VIN to the output node $ND_{OUT}$. In other embodiments, the transmitting switch 104 is a P-type transistor. In such cases, when the gate signal $V_{G1}$ or $V_{G2}$ is the low-level voltage, the P-type transistor is turned on. When the gate signal $V_{G1}$ or $V_{G2}$ is the high-level voltage, the P-type transistor is turned off.

The current limiting circuit 102 is coupled to the transmitting switch 104 and detects the current $I_{104}$ passing through the transmitting switch 104. When the current $I_{104}$ is higher than a first predetermined value, the current limiting circuit 102 provides the gate signal $V_{G2}$, wherein the gate signal $V_{G2}$ is at a low-level voltage to turn off the transmitting switch 104, and the transmitting switch 104 stops transmitting the input voltage VIN to the output node $ND_{OUT}$. However, when the current $I_{104}$ is less than the first predetermined value, the current limiting circuit 102 provides the gate signal $V_{G2}$, wherein the gate signal $V_{G2}$ is a high-level voltage, so that the transmitting switch 104 is turned on to transmit the input voltage VIN to the output node $ND_{OUT}$. The present disclosure does not limit the structure of the current limiting circuit 102. The current limiting circuit 102 can be replaced by any circuit which is capable of limiting current. The configuration of the current limiting circuit 102 is presented in greater detail in FIGS. 3A and 3B.

The short protection circuit 106 is coupled to the transmitting switch 104 and detects the voltage VOUT of the output node $ND_{OUT}$. When a short circuit occurs between the output node $ND_{OUT}$ and the ground node GND (i.e. the switch 108 is turned on), the voltage VOUT of the output node $ND_{OUT}$ suddenly drops to a ground voltage. At this time, since the voltage VOUT is less than a second predetermined value, the short protection circuit 106 outputs the gate signal $V_{G1}$ to turn off the transmitting switch 104. In this case, the gate signal $V_{G1}$ is a low-level voltage. When a short circuit does not occur between the output node $ND_{OUT}$ and the ground node GND, the short protection circuit 106 does not control the transmitting switch 104, and at this time, the transmitting switch 104 is controlled by the current limiting circuit 102.

Figure 2A:
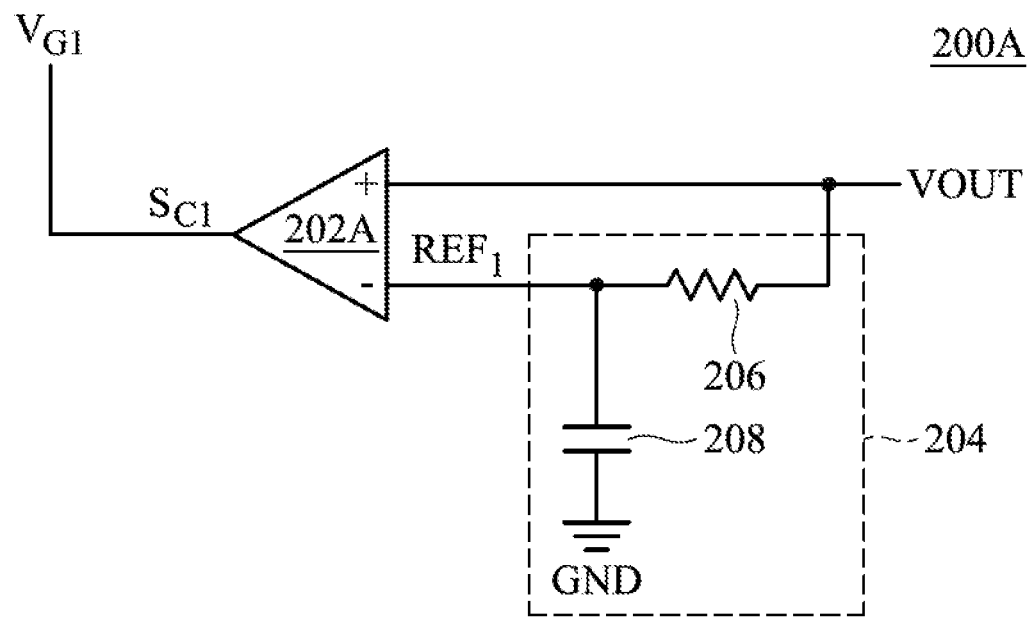
FIG. 2A is a schematic diagram of an exemplary embodiment of a short protection circuit, according to various aspects of the present disclosure.

FIG. 2A is a schematic diagram of an exemplary embodiment of a short protection circuit, according to various aspects of the present disclosure. As shown in FIG. 2A, the short protection circuit 200A comprises a comparator 202A and a set circuit 204. The non-inverting input of the comparator 202A receives the voltage VOUT of the output node $ND_{OUT}$. The inverting input of the comparator 202A receives a reference voltage $REF_1$ (i.e. the second predetermined value). The comparator 202A compares the voltage VOUT and the reference voltage $REF_1$ to generate a comparison result $S_{C1}$. In this embodiment, the comparison result $S_{C1}$ serves as the gate signal $V_{G1}$ directly.

The set circuit 204 receives the voltage VOUT and generates the reference voltage $REF_1$ according to the voltage VOUT. In this embodiment, the reference voltage $REF_1$ is less than the voltage VOUT of the output node $ND_{OUT}$. The present disclosure is not limited by the structure of the set circuit 204. In one embodiment, the set circuit 204 decreases the voltage VOUT to generate the reference voltage $REF_1$.

In this embodiment, the set circuit 204 is a delay circuit. The delay circuit comprises a resistor 206 and a capacitor 208. One terminal of the resistor 206 receives the voltage VOUT. The other terminal of the resistor 206 is coupled to the inverting input of the comparator 202A. One terminal of the capacitor 208 is coupled to the inverting input of the comparator 202A and the resistor 206. The other terminal of the capacitor 208 is coupled to the ground node GND. When the voltage VOUT is higher than the reference voltage $REF_1$, the comparator 202A outputs a comparison result $S_{C1}$, wherein the comparison result $S_{C1}$ is a high-level voltage. When the voltage VOUT is less than the reference voltage $REF_1$, it means that the output node $ND_{OUT}$ may be coupled to ground. Therefore, the comparator 202A outputs a comparison result $S_{C1}$, wherein the result $S_{C1}$ is a low-level voltage to turn off the transmitting switch 104.

Figure 2B:
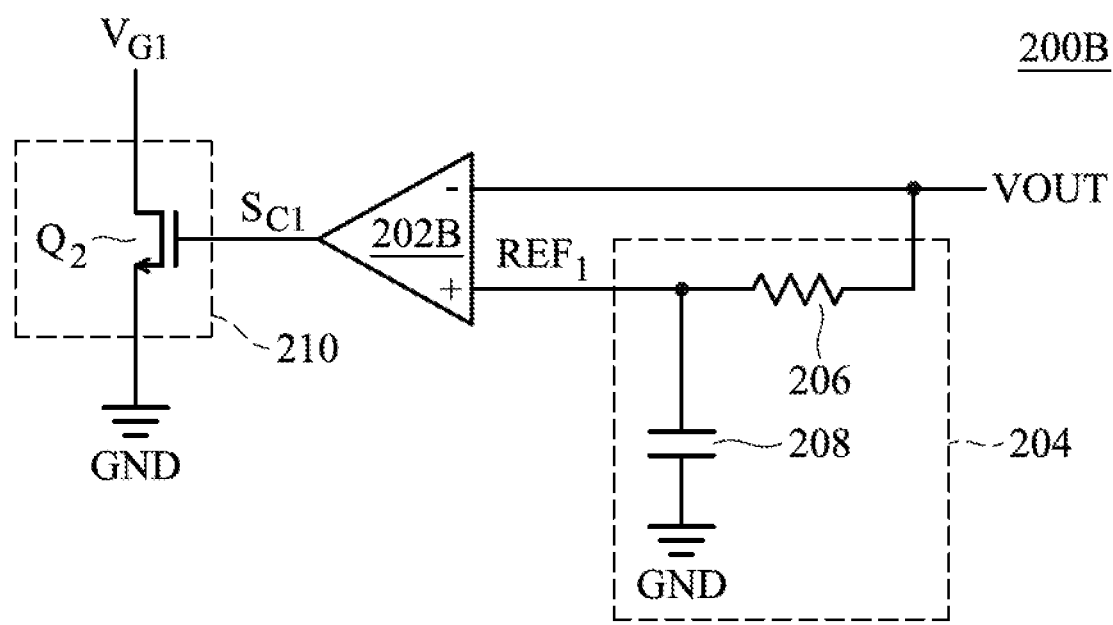
FIG. 2B is a schematic diagram of another exemplary embodiment of the short protection circuit, according to various aspects of the present disclosure.

FIG. 2B is a schematic diagram of another exemplary embodiment of the short protection circuit, according to various aspects of the present disclosure. FIG. 2B is similar to FIG. 2A exception that the short protection circuit 200B further comprises a switch 210. Furthermore, the inverting input of the comparator 202B receives the voltage VOUT, and the non-inverting input of the comparator 202B receives the reference voltage $REF_1$. The switch 210 controls the level of the gate signal $V_{G1}$ according to the comparison result $S_{C1}$. In this embodiment, the switch 210 is an N-type transistor $Q_2$, but the disclosure is not limited thereto. In other embodiments, the switch 210 is a P-type transistor.

In this embodiment, the gate of the N-type transistor $Q_2$ receives the comparison result $S_{C1}$. The drain of the N-type transistor $Q_2$ outputs the gate signal $V_{G1}$. The source of the N-type transistor $Q_2$ is coupled to the ground node GND. When the voltage VOUT is higher than the reference voltage $REF_1$, it means that no short circuit occurs between the output node $ND_{OUT}$ and the ground node GND. Therefore, the comparator 202B outputs the comparison result $S_{C1}$. In such case, the comparison result $S_{C1}$ is a low-level voltage to turn off the switch 210. When the voltage VOUT is less than the reference voltage $REF_1$, it means that a short circuit may occur between the output node $ND_{OUT}$ and the ground node GND. Therefore, the comparator 202B outputs the comparison result $S_{C1}$. The comparison result $S_{C1}$ is a high-level voltage. At this time, the switch 210 is turned on and uses a ground voltage as the gate signal $V_{G1}$. Since the gate signal $V_{G1}$ is a low-level voltage, the transmitting switch 104 shown in FIG. 1 is turned off.

Figure 3A:
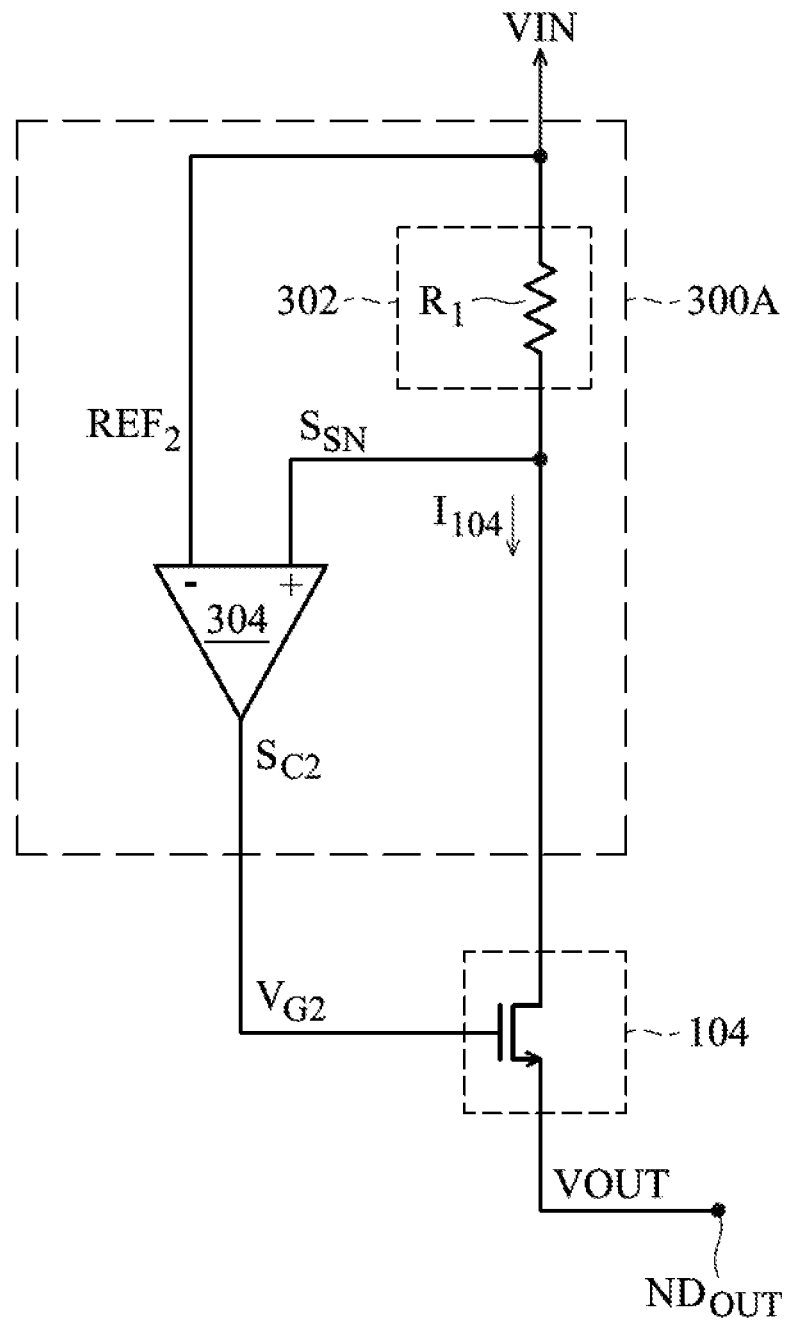
FIG. 3A is a schematic diagram of an exemplary embodiment of a current limiting circuit, according to various aspects of the present disclosure.

FIG. 3A is a schematic diagram of an exemplary embodiment of a current limiting circuit, according to various aspects of the present disclosure. The current limiting circuit 300A comprises a sensing element 302 and a comparator 304. The sensing element 302 is serially coupled to the transmitting switch 104 and generates a sensed signal $S_{SN}$ according to the current $I_{104}$ passing through the transmitting switch 104. The present disclosure is not limited by the kind of sensing element 302. In this embodiment, the sensing element 302 is a resistor $R_1$. One terminal of the resistor $R_1$ receives the input voltage VIN. The other terminal of the resistor $R_1$ is coupled to the transmitting switch 104 and the comparator 304.

The comparator 304 compares the sensed signal $S_{SN}$ and a reference voltage $REF_2$ to generate a comparison result $S_{C2}$. In this embodiment, the comparison result $S_{C2}$ serves as the gate signal $V_{G2}$ to turn on or off the transmitting switch 104. As shown in FIG. 3A, the non-inverting input of the comparator 304 receives the sensing signal $S_{SN}$. The inverting input of the comparator 304 receives the reference voltage $REF_2$.

When the current $I_{104}$ is higher than a predetermined value, the sensed signal $S_{SN}$ is less than the reference voltage $REF_2$. Therefore, the comparator 304 provides the comparison result $S_{C2}$. In such case, the comparison result $S_{C2}$ is a low-level voltage to turn off the transmitting switch 104. Therefore, the transmitting switch 104 stops transmitting the input voltage VIN to the output node $ND_{OUT}$. When the current $I_{104}$ is less than the predetermined value, the sensed signal $S_{SN}$ is higher than the reference voltage $REF_2$. Therefore, the comparator 304 provides the comparison result $S_{C2}$.

In such case, the comparison result $S_{C2}$ is a high-level voltage, and at this time, the transmitting switch 104 is turned on to transmit the input voltage VIN to the output node $ND_{OUT}$.

Figure 3B:
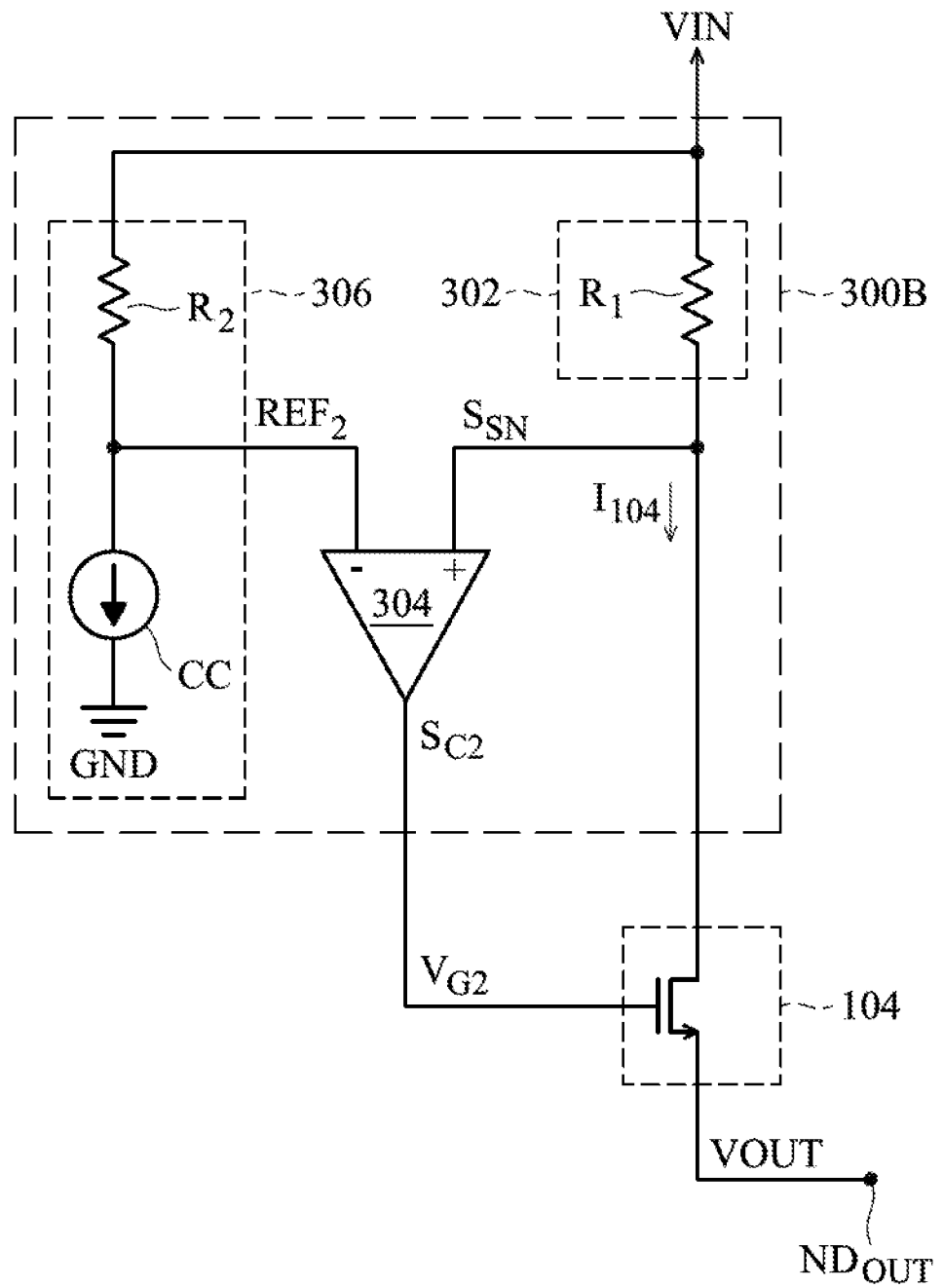
FIG. 3B is a schematic diagram of another exemplary embodiment of the current limiting circuit, according to various aspects of the present disclosure.

FIG. 3B is a schematic diagram of another exemplary embodiment of the current limiting circuit, according to various aspects of the present disclosure. FIG. 3B is similar to FIG. 3A exception that the current limiting circuit 300B shown in FIG. 3B further comprises a set circuit 306. The set circuit 306 is configured to generate the reference voltage $REF_2$. As shown in FIG. 3B, the set circuit 306 comprises a resistor $R_2$ and a current source CC. The resistor $R_2$ is coupled to the current source CC in series between the input voltage VIN and the ground node GND to generate the reference voltage $REF_2$. The present disclosure does not limit the generation method of the reference voltage $REF_2$. In one embodiment, the reference voltage $REF_2$ is slightly less than the input voltage VIN. Preferably, the set circuit 306 can be replaced by any circuit which is capable of reducing the input voltage VIN.

Figure 4:
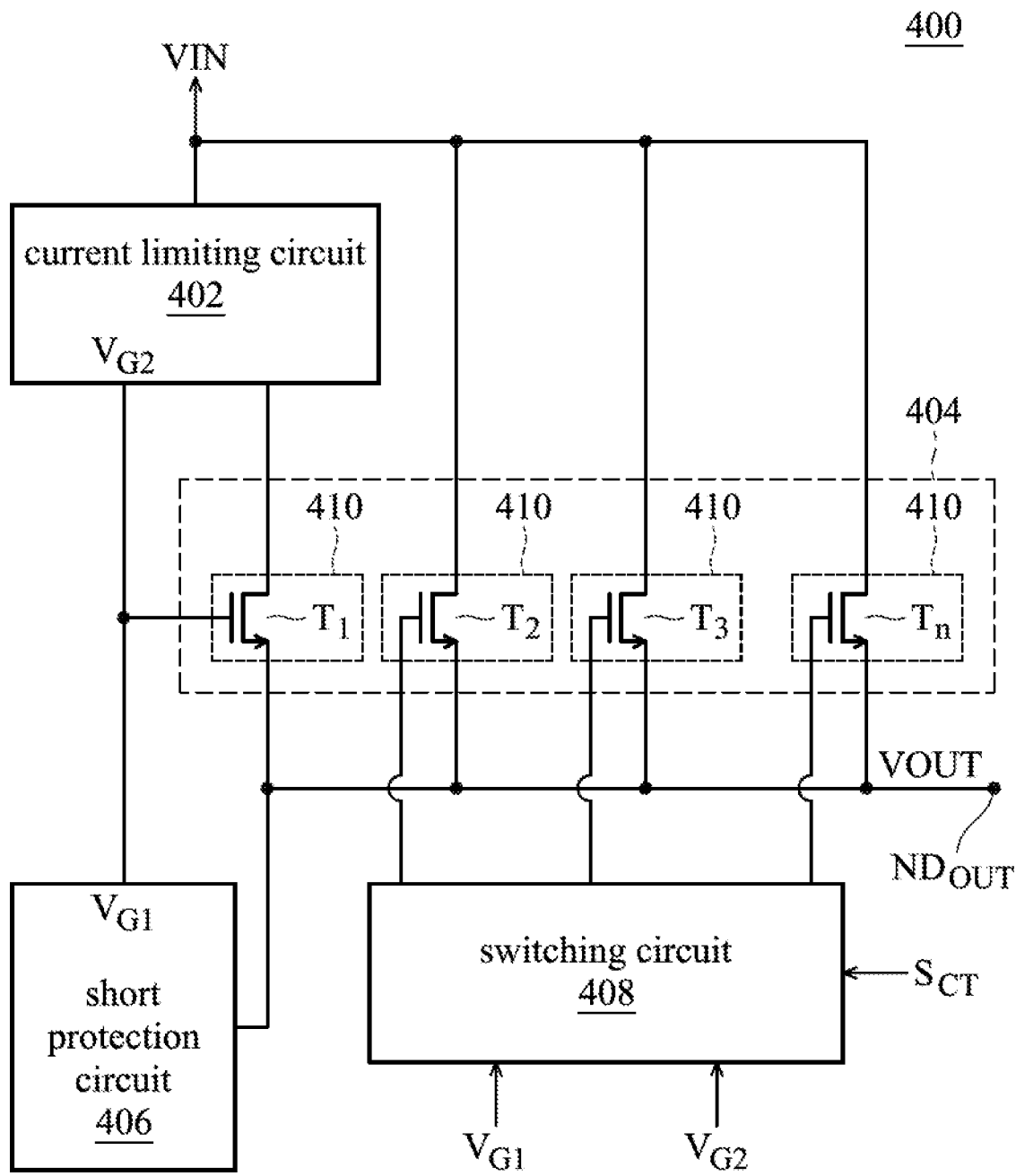
FIG. 4 is a schematic diagram of another exemplary embodiment of the power switching device, according to various aspects of the present disclosure.

FIG. 4 is a schematic diagram of another exemplary embodiment of the power switching device, according to various aspects of the present disclosure. The power switching device 400 comprises a current limiting circuit 402, a transmitting module 404, a short protection circuit 406 and a switching circuit 408. The current limiting circuit 402 is coupled to the transmitting module 404 to detect the current passing through the transmitting module 404. When the current passing through the transmitting module 404 is higher than a predetermined value, the current limiting circuit 402 asserts the gate signal $V_{G2}$ to turn off at least one transmitting path of the transmitting module 404. The present disclosure is not limited by the circuit structure of current limiting circuit 402. Any circuit can serve as the current limiting circuit 402, as long as the circuit is capable of detecting current. In one embodiment, the current limiting circuit shown in FIG. 3A or 3B is capable of serving as the current limiting circuit 402.

The transmitting module 404 is coupled to the current limiting circuit 402, the short protection circuit 406 and the switching circuit 408. In this embodiment, the transmitting module 404 comprises a plurality of transmitting switches 410 to provide a plurality of transmitting paths. The transmitting paths are configured to transmit the input voltage VIN to the output node $ND_{OUT}$. For brevity, the transmitting switches 410 are N-type transistors $T_1 \sim T_n$, but the disclosure is not limited thereto. In some embodiments, the transmitting switches 410 may be P-type transistors. In other embodiments, a portion of the transmitting switches 410 are N-type transistors and the other portion are P-type transistors.

In this embodiment, the drain of the N-type transistor $T_1$ is coupled to the current limiting circuit 402, the gate of the N-type transistor $T_1$ receives the gate signal $V_{G1}$ or $V_{G2}$, and the source of the N-type transistor $T_1$ is coupled to the output node $ND_{OUT}$. When the gate signal $V_{G1}$ or $V_{G2}$ is a low-level voltage, the N-type transistor $T_1$ is turned off. Additionally, the drains of the N-type transistors $T_2 \sim T_n$ receive the input voltage VIN. The gates of the N-type transistors $T_2 \sim T_n$ are coupled to the switching circuit 408. The source of the N-type transistors $T_2 \sim T_n$ are coupled to the output node $ND_{OUT}$. Taking the N-type transistor $T_2$ as an example, when the gate of the N-type transistor $T_2$ receives a high-level voltage, the N-type transistor $T_2$ is turned on and transmits the input voltage VIN to the output node $ND_{OUT}$. When the gate of the N-type transistor $T_2$ receives a low-level voltage, the N-type transistor $T_2$ is turned off.

The switching circuit 408 outputs the gate signal $V_{G1}$ or $V_{G2}$ according to a control signal $S_{CT}$. In one embodiment, when the current passing through the N-type transistor $T_1$ is higher than a first predetermined value, the current limiting circuit 402 outputs the gate signal $V_{G2}$. In such case, the level of the gate signal $V_{G2}$ is a low level to turn off the N-type transistor $T_2$, and at this time, the switching circuit 408 outputs at least one low-level voltage to at least one of the N-type transistors $T_2 \sim T_n$ according to a control signal $S_{CT}$. For example, the switching circuit 408 provides low-level voltages to all transmitting switches 410 to turn off the N-type transistors $T_2 \sim T_n$. In another embodiment, the switching circuit 408 provides a low-level voltage to the N-type transistor $T_2$ and provides high-level voltages to the N-type transistors $T_3 \sim T_n$. Therefore, only the N-type transistor $T_2$ is turned off and the N-type transistors $T_3 \sim T_n$ are turned on. When the number of the N-type transistors which are turned off is increased, the current passing through the output node $ND_{OUT}$ is reduced. Since a low current passes through the output node $ND_{OUT}$, the voltage of the output node $ND_{OUT}$ is gradually increased.

Similarly, when the voltage VOUT of the output node $ND_{OUT}$ is less than a second predetermined value, it means a short circuit occurs between the output node $ND_{OUT}$ and the ground node GND. Therefore, the short protection circuit 406 outputs the gate signal $V_{G1}$ to turn off the N-type transistor $T_1$. The gate signal $V_{G1}$ is a low-level voltage. At this time, the switching circuit 408 outputs at least one low-level voltage to at least one of the N-type transistors $T_2 \sim T_n$ according to the control signal $S_{CT}$. In one embodiment, the switching circuit 408 outputs low-level voltages to the N-type transistors $T_2 \sim T_n$ to turn off the N-type transistors $T_2 \sim T_n$. In another embodiment, the switching circuit 408 outputs low-level voltages to the N-type transistors $T_2 \sim T_{n-11}$. Since the N-type transistor $T_n$ is still turned on, the voltage VOUT of the output node $ND_{OUT}$ is gradually increased. In some embodiments, the control signal $S_{CT}$ is generated by a controller (not shown). In such cases, the controller generates the control signal $S_{CT}$ according to the current passing through the N-type transistor $T_1$ and the voltage VOUT.

The short protection circuit 406 turns on or off the transmitting switches 410 according to a second predetermined value. The second predetermined value relates to the voltage VOUT of the output node $ND_{OUT}$. When the input voltage VIN is changed, the short protection circuit 406 is not triggered inaccurately. Therefore, the efficiency of the power switching device 400 is increased.

Figure 5:
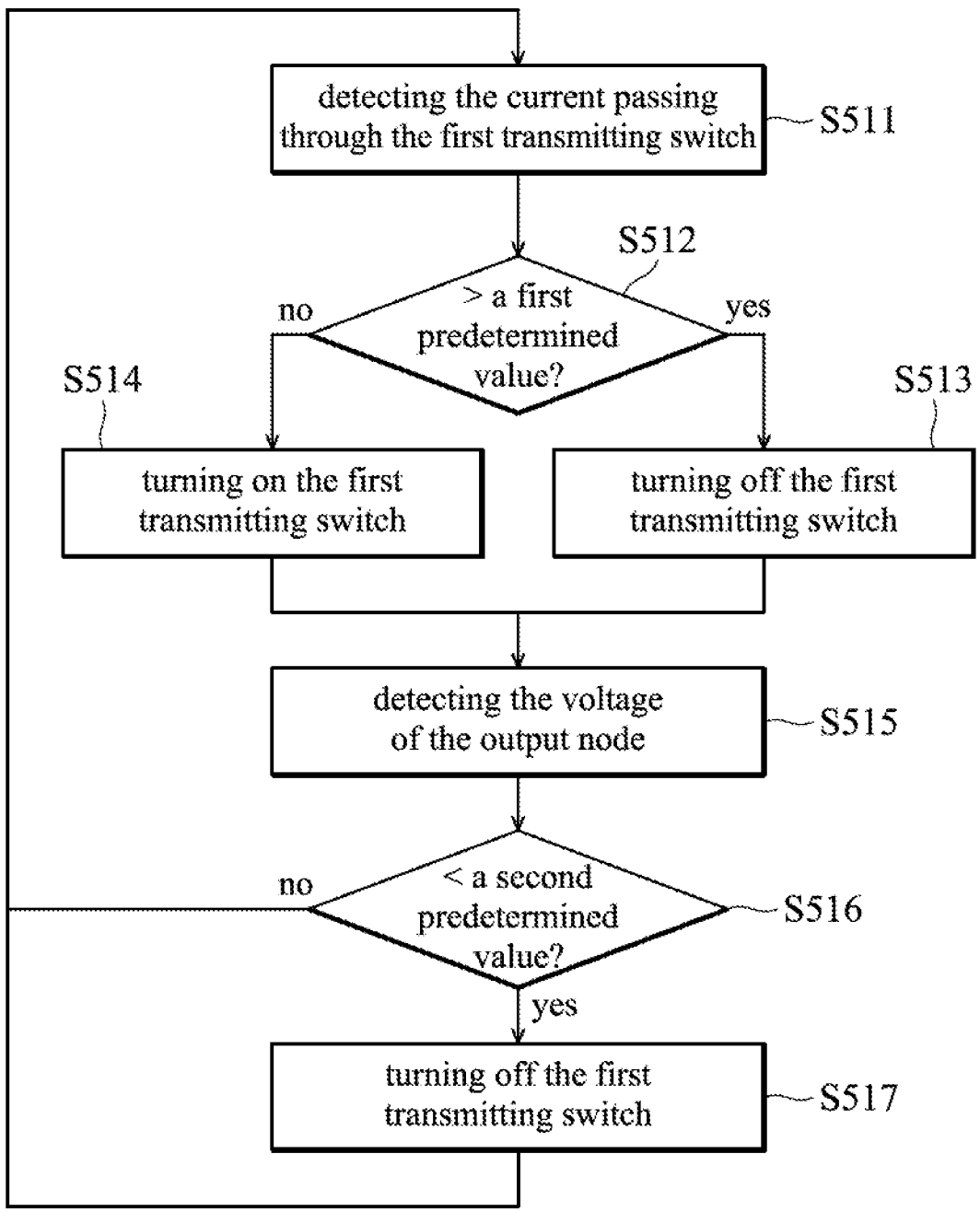
FIG. 5 is a flowchart of an exemplary embodiment of a control method, according to various aspects of the present disclosure.

FIG. 5 is a flowchart of an exemplary embodiment of a control method, according to various aspects of the present disclosure. The control method is applied to a power switching device. The power switching device comprises a first transmitting switch. When the first transmitting switch is turned on, the transmitting switch transmits an input voltage to an output node.

The current passing through the first transmitting switch is detected (step S511). The present disclosure is not limited by how the current passing through the first transmitting switch is detected. In one embodiment, a sensing element is utilized. The sensing element is coupled to the first transmitting switch in series. The current passing through the first transmitting switch is determined according to the cross voltage of the sensing element. The sensing element may be a resistor.

Step S512 determines whether the current passing through the first transmitting switch is higher than a first predetermined value. In this embodiment, the first predetermined value relates to the input voltage. For example, the first predetermined value is slightly less than the input voltage. In one embodiment, a set circuit is utilized to reduce the input voltage to generate the first predetermined value. When the current passing through the first transmitting switch is higher than the first predetermined value, the first transmitting switch is turned off to stop transmitting the input voltage to the output node (step S513). When the current passing through the first transmitting switch is less than the first predetermined value, the first transmitting switch is turned on (step S514). Therefore, the first transmitting switch still transmits the input voltage to the output node.

The voltage of the output node is detected (step S515). Step S516 determines whether the voltage of the output node is less than a second predetermined value. In this embodiment, the second predetermined value relates to the voltage of the output node. For example, the second predetermined value is slightly less than the voltage of the output node. In one embodiment, a set circuit is utilized to reduce the voltage of the output node to generate the second predetermined value.

When the voltage of the output node is less than the second predetermined value, the first transmitting switch is turned off to stop transmitting the input voltage to the output node (step S517). When the voltage of the output node is higher than the second predetermined value, step S511 is executed to turn on or off the first transmitting switch according to the current passing through the first transmitting switch.

In another embodiment, the first transmitting switch is coupled to a plurality of transmitting switches in parallel. When the first transmitting switch is turned off, at least one of the transmitting switches is turned on. For brevity, assume that the first transmitting switch is coupled to a second transmitting switch and a third transmitting switch in parallel. In one embodiment, when the voltage of the output node is less than the second predetermined value, the second transmitting switch is turned off. In such cases, the third transmitting switch may be turned on or off.

Furthermore, when the current passing through the first transmitting switch is higher than the first predetermined value, the first transmitting switch is turned off. At this time, the second transmitting switch may be turned on or off. When the current passing through the first transmitting switch is less than the first predetermined value, the second transmitting switch is turned on. In such cases, when the first transmitting switch is turned off, the second transmitting switch is turned on.

Since the second predetermined value relates to the voltage of the output node, when the input voltage is interfered by noise, the first transmitting switch still transmits the input voltage to the output node to maintain the voltage of the output node, as long as the voltage of the output node is higher than the second predetermined value.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the present disclosure has been described by way of example and in terms of the preferred embodiments, it is to be understood that the present disclosure is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. A power switching device, comprising:
   a first transmitting switch, wherein the first transmitting switch transmits an input voltage to an output node when the first transmitting switch is turned on;
   a current limiting circuit coupled to the first transmitting switch to detect a current passing through the first transmitting switch, wherein when the current is higher than a predetermined value, the current limiting circuit turns off the first transmitting switch; and
   a short protection circuit coupled to the first transmitting switch, wherein when a short circuit occurs between the output node and a ground node, the short protection circuit turns off the first transmitting switch, wherein the short protection circuit comprises:
   a first comparator comparing a voltage of the output node and a first reference voltage to generate a first comparison result to turn off the first transmitting switch; and
   a first set circuit receiving the voltage of the output node and generating the first reference voltage according to the voltage of the output node, wherein the first reference voltage is less than the voltage of the output node, wherein the first set circuit is a delay circuit, and the delay circuit decreases the voltage of the output node to generate the first reference voltage.

2. The power switching device as claimed in claim 1, wherein the first set circuit comprises:
   a resistor coupled between the output node and the first comparator; and
   a capacitor coupled between the first comparator and the resistor and coupled to the ground node.

3. The power switching device as claimed in claim 1, wherein the short protection circuit further comprises:
   a transistor turning off the first transmitting switch according to the first comparison result.

4. The power switching device as claimed in claim 3, wherein when the transistor is turned on, the first transmitting switch is turned off.

5. The power switching device as claimed in claim 4, wherein when the short circuit occurs between the output node and the ground node, the first comparator turns on the transistor such that the transistor transmits a ground voltage to the first transmitting switch to turn off the first transmitting switch.

6. The power switching device as claimed in claim 1, wherein when the current is less than the predetermined value, the current limiting circuit turns on the first transmitting switch.

7. The power switching device as claimed in claim 1, further comprising:
   a second transmitting switch, wherein when the second transmitting switch is turned on, the second transmitting switch transmits the input voltage to the output node,
   wherein when the current is less than the predetermined value, the current limiting circuit turns on the second transmitting switch, and wherein when the short circuit occurs between the output node and the ground node, the second transmitting switch is turned on.

8. The power switching device as claimed in claim 1, wherein the current limiting circuit comprises:
   a sensing element coupled to the first transmitting switch in series and detecting the current passing through the first transmitting switch to generate a sensed signal; and
   a second comparator comparing the sensed signal and a second reference voltage to generate a second comparison result and turning on or off the first transmitting switch according to the second comparison result.

9. The power switching device as claimed in claim 8, wherein the current limiting circuit further comprises:
   a second set circuit receiving the input voltage to generate the second reference voltage according to the input voltage.

10. A control method for a power switching device comprising a first transmitting switch, wherein when the first transmitting switch is turned on, the first transmitting switch transmits an input voltage to an output node, comprising:
    detecting a current passing through the first transmitting switch;
    turning off the first transmitting switch when the current is higher than a first predetermined value, and turning on the first transmitting switch when the current is less than the first predetermined value;
    detecting a voltage of the output node; and
    turning off the first transmitting switch when the voltage of the output node is less than a second predetermined value.

11. The control method as claimed in claim 10, further comprising:
    turning on or off the first transmitting switch when the voltage of the output node is higher than the second predetermined value.

12. The control method as claimed in claim 10, further comprising:
    decreasing the input voltage to generate the first predetermined value.

13. The control method as claimed in claim 10, further comprising:
    decreasing the voltage of the output node to generate the second predetermined value.

14. The control method as claimed in claim 10, further comprising:
    turning off a second transmitting switch when the voltage of the output node is less than the second predetermined value, wherein the second transmitting switch is coupled to the first transmitting switch in parallel.

15. The control method as claimed in claim 14, further comprising:
    turning off the second transmitting switch when the current is higher than the first predetermined value; and
    turning on the second transmitting switch when the current is less than the first predetermined value.

16. The control method as claimed in claim 14, further comprising:
    turning on a third transmitting switch when the voltage of the output node is less than the second predetermined value, wherein the third transmitting switch is coupled to the first transmitting switch in parallel, and when the third transmitting switch is turned on, the third transmitting switch transmits the input voltage to the output node.

17. The control method as claimed in claim 16, further comprising:
    turning off the third transmitting switch when the current is higher than the first predetermined value; and
    turning on the third transmitting switch when the current is less than the first predetermined value.

* * * * *